(12) United States Patent
Backstrom et al.

(10) Patent No.: US 10,174,456 B2
(45) Date of Patent: Jan. 8, 2019

(54) TECHNIQUE TO IMPROVE PAPER MACHINE CROSS-DIRECTIONAL MODEL PREDICTIVE CONTROL PERFORMANCE BY CREATING A MEASUREMENT PROFILE REFERENCE TRAJECTORY

(71) Applicant: Honeywell Limited, Mississauga (CA)

(72) Inventors: Johan Backstrom, North Vancouver (CA); Michael Forbes, North Vancouver (CA)

(73) Assignee: Honeywell Limited, Mississauga (CA)

( * ) Notice: Subject to any disclaimer, the term of this patent is extended or adjusted under 35 U.S.C. 154(b) by 211 days.

(21) Appl. No.: 15/273,702

(22) Filed: Sep. 23, 2016

(65) Prior Publication Data

US 2018/0087219 A1    Mar. 29, 2018

(51) Int. Cl.
*D21G 9/00* (2006.01)
*G05B 13/04* (2006.01)

(52) U.S. Cl.
CPC ......... *D21G 9/0027* (2013.01); *G05B 13/048* (2013.01); *G05B 2219/40148* (2013.01)

(58) Field of Classification Search
CPC ................ D21G 9/0027; G05B 13/048; G05B 2219/40148
See application file for complete search history.

(56) References Cited

U.S. PATENT DOCUMENTS

| | | | |
|---|---|---|---|
| 4,916,615 A | 4/1990 | Chittineni | |
| 5,566,134 A | 10/1996 | Dufault | |
| 5,758,047 A | 5/1998 | Lu et al. | |
| 6,086,237 A | 7/2000 | Gorinevsky et al. | |
| 6,233,495 B1* | 5/2001 | Chen | D21G 9/0027 700/122 |
| 6,807,510 B1 | 10/2004 | Backstrom et al. | |
| 7,454,253 B2 | 11/2008 | Fan | |
| 7,459,060 B2 | 12/2008 | Stewart | |

(Continued)

OTHER PUBLICATIONS

Fan et al., Two-dimensional frequency analysis for unconstrained model predictive control of cross-directional processes, Automatica 40 (11) (2004) 1891-1903.

(Continued)

*Primary Examiner* — Christopher E. Everett
(74) *Attorney, Agent, or Firm* — Charles H. Jew (57) ABSTRACT

Controlling a multiple-array, sheetmaking cross-directional process with a multivariable model predictive controller (MPC) employs a cost function incorporating a prediction horizon. The MPC provides a measurement profile target reference trajectory over the prediction horizon of the MPC cost function. Improved CD-MPC performance is achieved by employing a measurement profile target reference trajectory over the prediction horizon in the MPC cost function. A series of target profiles creates a reference trajectory to bring the cross-direction measurements smoothly from their current profile to the final target. By carefully designing the reference trajectory, the CD-MPC exhibits a good measurement response without aggressive control action. The current measurement target profile can be filtered through a first order plus deadtime process at each controller update and repeating the filter operation once for each step of the MPC prediction horizon generates a full reference trajectory for the profile.

15 Claims, 7 Drawing Sheets

(56) References Cited

U.S. PATENT DOCUMENTS

| | | | |
|---|---|---|---|
| 7,577,483 B2 | 8/2009 | Fan et al. | |
| 7,650,195 B2 | 1/2010 | Fan et al. | |
| 7,820,012 B2 | 10/2010 | Stewart | |
| 8,224,476 B2 | 7/2012 | Chu et al. | |
| 9,122,261 B2 | 9/2015 | Lu | |
| 2004/0167657 A1* | 8/2004 | Sasaki | D21G 9/0027 700/127 |
| 2006/0111858 A1 | 5/2006 | Zhu | |
| 2007/0239310 A1* | 10/2007 | Fan | G05B 13/048 700/129 |
| 2011/0295390 A1* | 12/2011 | Chu | D21F 7/06 700/30 |
| 2013/0041482 A1 | 2/2013 | Badwe et al. | |
| 2014/0358254 A1 | 12/2014 | Chu et al. | |
| 2015/0268645 A1 | 9/2015 | Shi et al. | |
| 2015/0330022 A1* | 11/2015 | Fu | G05B 17/02 700/128 |
| 2016/0041536 A1 | 2/2016 | Benosman et al. | |

OTHER PUBLICATIONS

Gorinevsky et al, Performance analysis of cross-directional process control using multivariable and spectral models, IEEE Transactions on Control Systems Technology 8 (7) (2000) 589-600.

Gorinevsky et al, Performance-optimal applied identi-fication of separable distributed-parameter processes, IEEE Transactions on Automatic Control 46 (10) (2001) 1548-1589.

S. R. Duncan, The cross-directional control of web forming process, Ph.D. thesis, University of London, UK (1989).

Laughlin et al, Robust performance of cross-directional control systems for web forming processes, Automatica 29 (6) (1993) 1395-1410.

Duncan et al, The spatial bandwidth of cross directional control systems for web processes, Automatica 33 (2) (1997)139-153.

Stewart et al, Two-dimensional loop shaping, Automatica 39 (5) (2003) 779-792.

Stewart et al, Feedback controller de-sign for a spatially-distributed system: the paper making problem, IEEE Transactions on Control Systems Technology 11 (5) (2003) 612-628.

Fan et al, Approximate steady-state performance prediction of large-scale constrained model predictive control systems, IEEE Transactions on Control Systems Technology 13 (6) (2005) 884-895.

Fan et al,Automated tuning of large-scale multivariable model predictive controllers for spatially-distributed processes, in: American Control Conference, Minneapolis, MN, USA, 2006, pp. 5517-5523.

Van Antwerp et al, Cross-directional control of sheet and film processes, Automatica 43 (2) (2007) 191-211.

Featherstone, et al, Control-oriented modeling of sheet and film processes, AIChE Journal 43 (8) (1997) 1988-2001.

Gorinevsky et al, Identification tool for cross-directional processes, IEEE Transactions on Control Systems Technology 11 (5) (2003) 629-640.

Rojas et al, , Spatial frequency antiwindup strategy for cross-directional control problems, IEE Proceedings: Contro Theory and Applications 149 (5) (2002) 414-422.

* cited by examiner

TECHNIQUE TO IMPROVE PAPER MACHINE CROSS-DIRECTIONAL MODEL PREDICTIVE CONTROL PERFORMANCE BY CREATING A MEASUREMENT PROFILE REFERENCE TRAJECTORY

FIELD OF THE INVENTION

The present invention generally relates to monitoring and controlling continuous sheeting making systems using model predictive controllers and more specifically to techniques that provide a measurement profile target reference trajectory over the prediction horizon in the MPC cost function.

BACKGROUND OF THE INVENTION

The control problems involved in paper-making processes can be divided into machine-directional (MD) control and cross-directional (CD) control. MD control concerns the paper properties along the machine direction and many control strategies have been reported and implemented.

CD control aims to reduce the variability of the paper property along the cross direction and to tune the dynamical property to meet the end users' specifications. The paper property is measured by a scanner mounted downstream traversing back and forth across the paper sheet; various feedback control strategies are proposed to achieve consistency of the paper profile. CD control is a challenging control problem that may involves hundreds of process actuators and hundreds or thousands of process measurements, and process models typically have a large amount of uncertainty associated with them. There are spatial and temporal aspects to this problem. The spatial aspect relates to variability of the process measurements across the sheet while the temporal aspect relates to variability of each process measurement over time.

Model predictive control (MPC), a control strategy which takes control and state constraints explicitly into consideration, has seen thousands of applications in industry, and has been recently introduced into CD control in paper-making processes with the advance of computational capability as well as the development of fast quadratic programming (QP) solvers.

In paper machine (and other flat sheet processes) CD control, one wishes to maintain the cross-directional measurement profile as close as possible to some target profile (typically a flat profile). Cross-directional model predictive control (CD-MPC) keeps measurement profiles close to target by finding sequences of actuator moves that minimize profile error from target for some period of time into the future (known as prediction horizon) according to a quadratic cost function. When the same target is used over the entire prediction horizon, the MPC controller will make aggressive actuator movements to bring the measurement profile to target as quickly as possible, unless actuator movements are somehow restrained. To restrain actuator movements to prevent undesirably aggressive movements a cost of actuator movement is included in the MPC cost function. Often this actuator movement must be heavily weighted in the cost function to prevent aggressive actuator movement in response to measurement profile deviations from target; however, this movement penalization can also make measurement responses unnecessarily slow (sluggish). A method to have faster measurement responses without undesirably aggressive control action is needed.

SUMMARY OF THE INVENTION

The present invention is based in part on the recognition that improved CD-MPC performance can be ascertained by employing a measurement profile target reference trajectory over the prediction horizon in the MPC cost function. Instead of using the same target profile over the entire prediction horizon, a series of target profiles is used, creating a reference trajectory to bring the cross-direction measurements smoothly from their current profile to the final target. By appropriately designing the reference trajectory, the CD-MPC can achieve a good (non-sluggish) measurement response without requiring undesirably aggressive control action.

In one aspect, the invention is directed to a system which forms a material in a spatially-distributed multivariable-array cross-directional process wherein the system includes: at least one set of actuator arrays each distributed adjacent to the material in the cross direction (CD), wherein each set of actuator arrays is controllable to vary the properties of the material; means for measuring and acquiring data about the properties of the material and generating a cross-directional measurement; and a multivariable model predictive controller (MPC) for providing CD control to the cross-directional process, wherein the MPC employs a cost function incorporating a prediction horizon, wherein the MPC in response to signals that are indicative of the properties of the material, provides signals to the at least one set of actuator arrays to vary properties of the material, and wherein the MPC is configured to provide a measurement profile target reference trajectory over the prediction horizon of the MPC cost function.

In another aspect, the invention is directed to a method of controlling a spatially-distributed multiple-array, sheetmaking cross-directional (CD) process that forms a material and having at least one manipulated actuator array and at least one controlled measurement array that generates a cross-directional measurement, said method includes employing a multivariable model predictive controller (MPC) which employs a cost function incorporating a prediction horizon, wherein the MPC in response to signals that are indicative of the properties of the material, provides signals to at least one set of actuator arrays to vary properties of the material, and wherein the MPC is configured to provide a measurement profile target reference trajectory over the prediction horizon of the MPC cost function.

A preferred technique of implementing the invention is to filter the current measurement target profile through a first order plus deadtime process at each controller update. This filter operation is repeated once for each step of the MPC prediction horizon to generate a full reference trajectory for the profile. The filter is initialized to the current measurement profile so that the reference trajectory provides a smooth path from the current profile towards the final target profile. Operations of the MPC are tuned by the filtered signals.

The inventive technique is particularly suited for CD control of paper machines where the profile generation can is applied to each measurement array. With the present invention, a reference trajectory is applied to an entire CD measurement profile. Generally, for each measurement array, its model relationship to the actuator array which is selected for control is examined to determine the appropriate reference trajectory. This allows good design of the reference profiles but does not restrict the multivariable controller from using all available actuator arrays to control the measurement profiles. Typically for paper machines, (i) paper weight measurement is paired with a slice lip actuator beam or a headbox dilution flow beam, (ii) paper moisture measurement is paired with a steambox beam or a rewet shower beam, and (iii) paper caliper measurement is paired with a calender induction heater array.

DETAILED DESCRIPTION OF PREFERRED EMBODIMENTS

Figure 1:
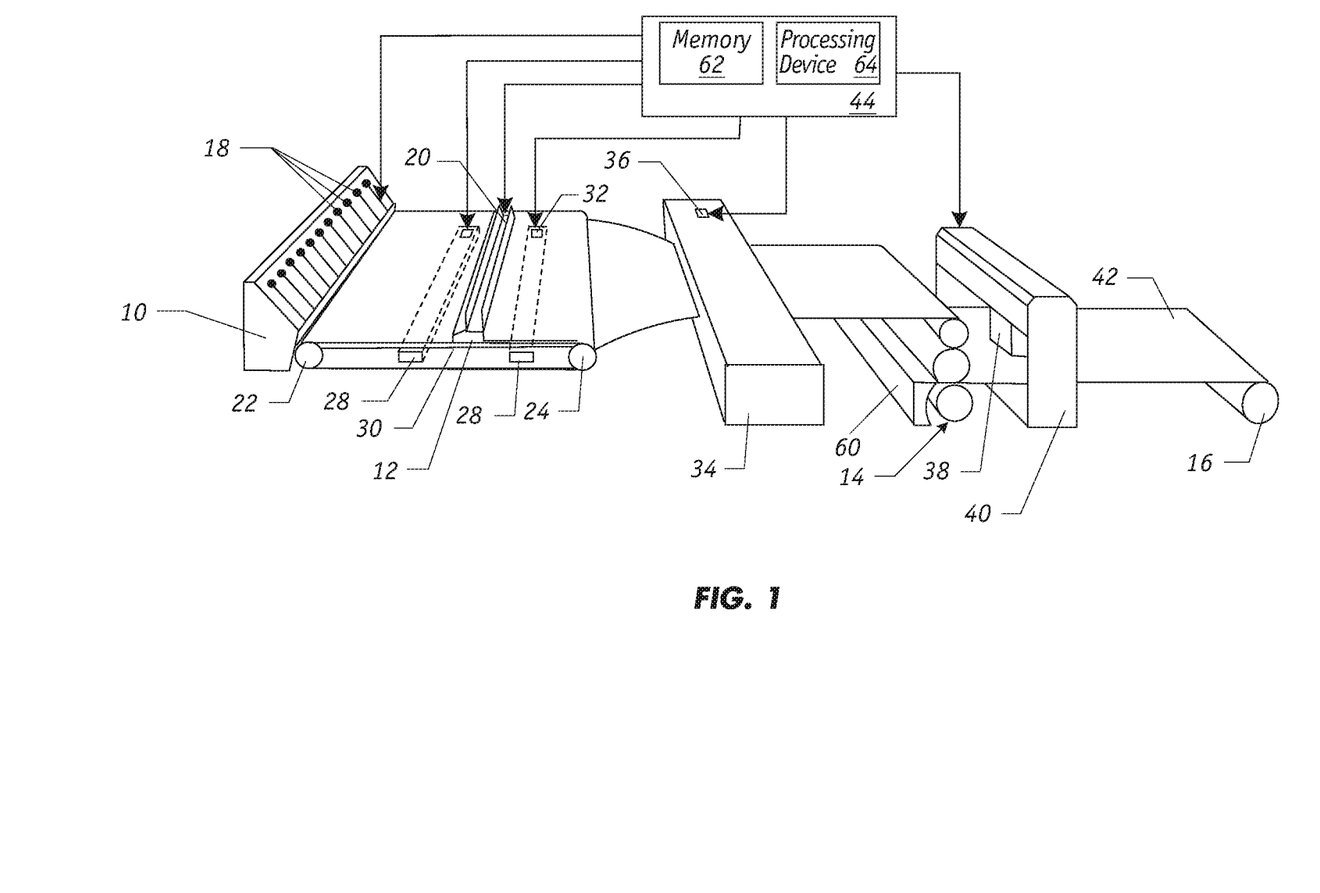
FIGS. 1, 2, and 3 are schematic illustrations of a papermaking system.

As shown in FIG. 1, a system for producing continuous sheet material includes various processing stages such as headbox 10, steambox 12, a calendering stack 14 and reel. The array of actuators 18 in headbox 10 controls the discharge of wet stock (or feedstock) material through a rectangular opening of locally adjustable width, known as a slice, onto supporting web or wire 30 which rotates between rollers 22 and 24. Similarly, actuators 20 on steambox 12 can control the amount of steam that is injected at points across the moving sheet. An array of rewet shower actuators (not shown) located within the dryer section 34 down from calendering stack 14 add water onto the surface of the paper to control the moisture profile, reduce or prevent over-drying or correct any dry streaks in the paper. Sheet material exiting the wire 30 passes through a series of dryers 34 which includes additional actuator arrays 36 such as rewet showers and/or additional steamboxes to influence the cross-directional moisture profile of the sheet. Calender induction heater 60 is a non-contacting device which creates a magnetic field that makes electrons in the adjacent metal roll move around and heats the roll. The expanding roll reduces the gap between the rolls thereby further smoothing the paper. There are many zones across the induction heater so the calender roll can be adjusted at many points along its length which allows CD profile control. A scanning sensor 38, which is supported on supporting frame 40, continuously traverses and measures properties of the finished sheet in the cross direction. The finished sheet product 42 is then collected on reel 16. Each array of actuators is often referred to as a "beam".

As used herein, the "wet end" portion of the system includes the headbox, the web, and those sections just before the dryer, and the "dry end" comprises the sections that are downstream from the dryer. Typically, the two edges of the wire in the cross direction are designated "front" and "back" (alternatively, referred as the "tending" and 'drive") with the back side being adjacent to other machinery and less accessible than the front side.

The system further includes a computer 44 that receives measurement profile information obtained by scanner sensors 38, and that is connected, for example, to actuators 18, 20, 32 and 36 on the headbox 10, steam box 12, vacuum boxes 28, and dryer 34, respectively. The computer 44 includes a control system that operates in response to the cross-directional measurements from scanner sensor 38. In operation, scanning sensor 38 provides the computer 44 with signals that are indicative of the magnitude of a measured sheet property, e.g., caliper, dry basis weight, gloss or moisture, at various cross-directional measurement points. The computer 44 also includes software for controlling the operation of various components of the sheetmaking system, including, for example, the above described actuators. To implement to the control system of the present invention, computer 44 can include memory 62 and processing devices 64 to execute software/firmware instructions for performing various operations related to MPC control of an industrial process.

Figure 2:
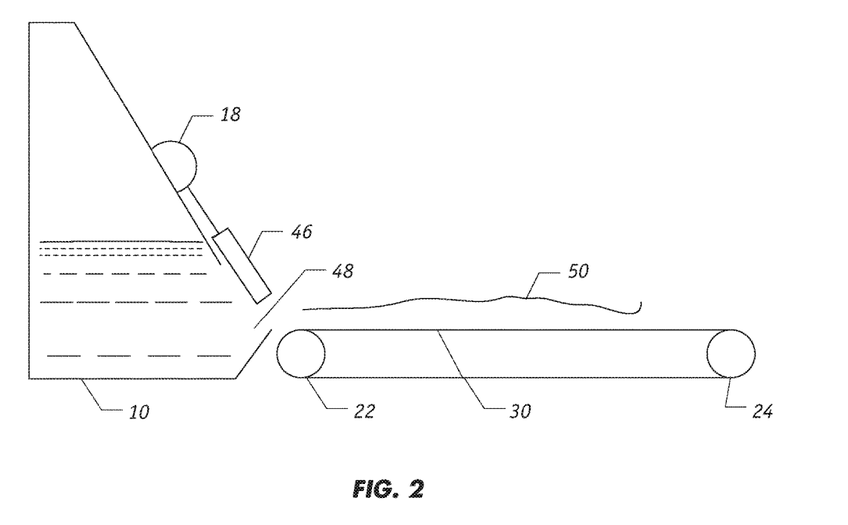

FIG. 2 depicts a slice lip control system which is mounted on a headbox 10 for controlling the extent to which a flexible slice lip 46 extends across the discharge gap 48 at the base of the headbox 10. The slice lip 46 extends along the headbox 10 across the entire width of the web in the cross-direction. The actuator 18 is an array of independently operable slice lip actuators, each able to locally deflect the slice lip 46 to change to the width of gap 48. The spacing between the individual actuators in the actuator array may or may not be uniform. Wetstock 50 is discharged onto wire 30 which rotates by the action of roller 24 and the wire turning roll (not shown).

Figure 3:
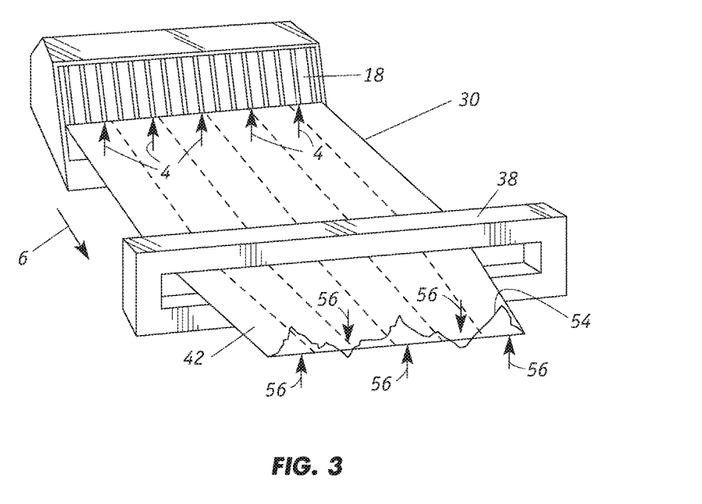

As an example shown in FIG. 3, the amount of feedstock that is discharged through the gap and onto the wire 30 at various points across the machine is controlled by adjusting the individual actuators of the slip lip actuator 18. The feed flow rates through the gaps ultimately affect the properties of the finished sheet material, i.e., the paper 42. Specifically, as illustrated, a plurality of actuators 18 extend in the cross direction over wire 30 that is moving in the machine direction indicated by arrow 6. Actuators 18 can be manipulated to control sheet parameters in the cross direction. A scanning device 38 is located downstream from the actuators and it measures one or more the properties of the sheet. In this example, several actuators 18 are displaced as indicated by arrows 4 and the resulting changes in sheet property is detected by scanner 38 as indicated by peaks 56 in the scanner profile 54. This type of operation is typically used in traditional open and closed-loop bump tests. It should be noted that besides being positioned in the headbox, CD actuators can be placed at one or more strategic locations in the papermaking machine including, for example, steamboxes, rewet showers and calender roll induction heaters.

It is understood that the inventive technique is sufficiently flexible as to be applicable for online implementation with any large-scale industrial at least one actuator array and at least one product quality measurements cross-directional process that is controlled by a multivariable model predictive controller (MPC) such as in papermaking. Suitable paper machine processes where paper is continuously manufactured from wet stock are further described, for instance, in U.S. Pat. No. 6,807,510 to Backstrom and He and U.S. Pat. No. 8,224,476 to Chu et al., and U.S. 2015/0268645 to Shi et al., which are incorporated herein by reference. While the invention will be described with respect to a papermaking machine, it is understood that the invention is applicable to industrial plastic sheetmaking, rubber sheet-making, sheet metal operations and other sheetmaking operations.

I. CD-MPC Structure

Figure 4:
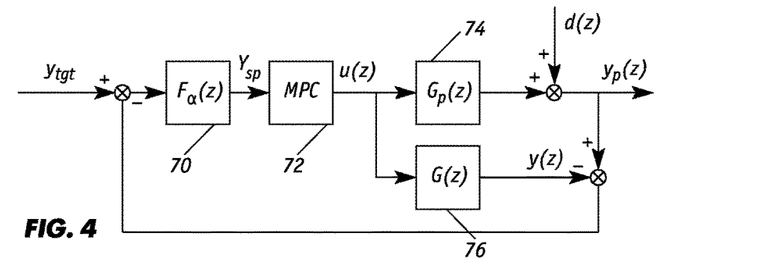
FIG. 4 is a block diagram of a closed-loop CD-MPC system.

As shown in FIG. 4, the closed-loop CD-MPC structure for a paper-making process consists of four parts: the real process $G_p(z)$ (74), the nominal model $G(z)$ (76), the MPC (72) and the temporal filter $F_a(z)$ (70), which are described in detail in the following. Moreover, the associated signals are defined as follows: $y_{tgt}$, $Y_{sp}$, $u(z)$, $d(z)$, $y_p(z)$, and $y(z)$ are the output target, the reference trajectory, the actuator profile, the disturbance profile, the measurement profile, and the predicted output profile, respectively.

Nominal Model

The nominal model $G(z)$ of a CD paper-making process is characterized by $$G(z) = G_0 h(z), \quad h(z) = \frac{(1-a)z^{-t_d}}{1 - az^{-1}}, \quad (1)$$

where $G_0$ is a constant matrix that characterizes the spatial response/gain of the CD process; $h(z)$ is the temporal transfer function of the process, in which $a$ and $t_d$ are the discrete-time parameters that determine the process time constant and time delay.

The spatial gain matrix $G_0$ has the parameterized structure as shown below:

$$G_0 = [g_1, \ldots, g_n] \in \mathbb{R}^{m \times n}, \quad (2)$$

$$g_k = f(x, \gamma, \eta, \xi, \beta, c_k)$$

$$= \frac{\gamma}{2}\left\{ e^{-\frac{\eta(x-c_k+\beta\xi)^2}{\xi^2}} \cos\left[\frac{\pi(x-c_k+\beta\xi)}{\xi}\right] + e^{-\frac{\eta(x-c_k-\beta\xi)^2}{\xi^2}} \cos\left[\frac{\pi(x-c_k-\beta\xi)}{\xi}\right] \right\},$$

$$x = 1, \ldots, m, k = 1, \ldots n,$$

where $\gamma$, $\eta$, $\xi$, and $\beta$ are the process gain, attenuation, width, and divergence, respectively. They are utilized to characterize the spatial response of each specific actuator. For the $k^{th}$ actuator, $c_k$ is the alignment parameter that determines the center of the corresponding spatial response.

CD Model Predictive Controller

For industrial CD-MPC controllers that are applied in paper mills, the following optimization problem is solved:

$$\min_{\Delta u(k)} \left\{ \sum_{i=1}^{H_p} (y(k+i) - y_{sp}(k+i))^T Q_1 (y(k+i) - y_{sp}(k+i)) + \right. \quad (3)$$

$$\sum_{i=0}^{H_u-1} [\Delta u(k+i)^T Q_2 \Delta u(k+i) + (u(k+i) - u_{sp}(k+i))^T$$

$$\left. Q_3(u(k+i) - u_{sp}(k+i)) + u(k+i)^T Q_4 u(k+i)] \right\},$$

subject to the system dynamics defined in (1) and the constraints as follows:

$$\Omega \Delta u(k) \leq b - \Gamma u(k-1), \quad (4)$$

where $H_p$ is the prediction horizon, and $H_u$ is the control horizon; $y(k) \in \mathbb{R}^m$ and $y_{sp}(k) \in \mathbb{R}^m$ are the predicted output profile and the corresponding reference signal; $u(k) \in \mathbb{R}^n$ and $u_{sp}(k) \in \mathbb{R}^n$ are the actuator profile and its reference; $\Delta u(k)$ ($=u(k)-u(k-1)$) is the change in the actuator profile; $Q_1$ to $Q_3$ are diagonal weighting matrices; $Q_4$ is the weighting matrix on the actuator bending and/or picketing in the following form:

$$Q_4 = q_4 S_b^T S_b, \quad (5)$$

$$S_b = \begin{bmatrix} -1 & 1 & 0 & \cdots & \cdots & \cdots & 0 \\ 1 & -2 & 1 & \ddots & \ddots & \ddots & \vdots \\ 0 & 1 & -2 & \ddots & \ddots & \ddots & \vdots \\ \vdots & \ddots & \ddots & \ddots & \ddots & \ddots & \vdots \\ \vdots & \ddots & \ddots & \ddots & -2 & 1 & 0 \\ \vdots & \ddots & \ddots & \ddots & 1 & -2 & 1 \\ 0 & \cdots & \cdots & \cdots & 0 & 1 & -1 \end{bmatrix},$$

where $q_4$ is a scalar weight and $S_b \in \mathbb{R}^{n \times n}$ is the "bending moment matrix". Note that for the actuator profile, the first and second order derivatives are incorporated in the matrix $S_b$, and thus the bending behavior is penalized in the cost function of CD-MPC. $\Omega$, $\Gamma$ and $b$ are the constraint matrices (vectors) derived based on the physical limitations of the process.

Temporal Filter

The traditional output reference trajectory is constructed as a step change, which requires the predicted output profile to track the output target immediately after the dead time of the process. The measurement profile reference trajectory is the series of reference profiles over the entire prediction horizon, i.e. $Y_{sp} = [y_{sp}(k+1), y_{sp}(k+2), \ldots, y_{sp}(k+H_p)]$. For illustrative purposes, a known temporal filter is utilized to generate the reference trajectory $Y_{sp}(k)$ based on $$Y_{sp}(k) = F_\alpha(y_{tgt}(k) - d_y(k)), \quad (6)$$

where $y_{tgt}(k)$ is the output target, and $d_y(k) = y_p(k) - y(k)$ is the disturbance estimated based on the process output $y_p(k)$ and predicted output $y(k)$. $F_\alpha$ is the time domain implementation of $f_\alpha(z)$ based on $y_{sp}(z) = f_\alpha(z) I_m(y_{tgt}(z) - d_y(z))$ and $f_\alpha(z)$ is the temporal filter $$f_\alpha(z) = \frac{(1-a_r)z^{-t_d}}{1 - a_r z^{-1}}, \quad (7)$$

where $a_r = e^{-\Delta T/\alpha \tau}$; $\Delta T$ is the sampling time, and $\tau$ is the continuous-time time constant of the temporal transfer function of the process; $I_m$ represents an m-by-m identity matrix. Note that based on this filter, the aggressiveness of the control signal can be adjusted by the parameter $a$ with $Q_2$ set to a small-valued scalar matrix.

II. Computer Simulation and CD Profile Reference Trajectories for CD-MPC Control A CD process consisting of one actuator beam and one measurement can be as:

$$y(z) = G_0 \frac{(1-a)z^{-t_d}}{1 - az^{-1}} u(z) \quad (8)$$

The process can be controlled with an MPC controller. A suitable controller is described in U.S. Pat. No. 6,807,510 to Backstrom and He. The cost function for the MPC controller is set forth in optimization problem (3). The measurement profile reference trajectory $Y_{sp}=[y_{sp}(k+1), y_{sp}(k+2), \ldots, y_{sp}(k+H_p)]$ typically is generated by taking the current target profile and assuming that the target should be met once the process time delay elapses, i.e.

$$Y_{sp} = \left[ y_{tgt}(k-t_d) - d_y(k-t_d), \ldots, y_{tgt}(k-1) - d_y(k-1), \underbrace{y_{tgt}(k) - d_y(k), \ldots, y_{tgt}(k) - d_y(k)}_{H_p - t_d \text{ times}} \right].$$

Using this typical approach, one must use the $Q_2$ cost function weighting matrix to prevent large and aggressive actuator movements.

Computer simulations to illustrate the invention were conducted. The simulations modeled a papermaking machine as depicted in FIG. 1 with a headbox having a plurality of actuators that controlled pulp stock discharge through the corresponding slice lip opening. The weight of the finished paper was measured by a scanner at 250 points or bins across the width of the paper from the front to back side of the machine; each bin represents a distance of about 5 mm. The model also simulated closed-loop control of the actuators in response to signals from the scanner.

The simulation includes a dynamic model of how a paper weight measurement profile changes over time in response to changes in the autoslice (a paper machine slice lip actuator array) profile. The autoslice actuator positions are used to control the weight profile, using feedback control. Specifically, the control algorithm used was a model predictive control where the cost function (4) is minimized. The model predictive control includes the generation of the profile target trajectories which is the main idea that we are claiming. The generation of smooth and achievable profile target trajectories moderates the behavior of the controller since it reduces the need for large and frequent actuator movements. (Smooth and achievable target trajectories can be achieved by moderate actuator movements.) Without the target trajectories, the controller will act much more aggressively unless the other tuning parameters in the cost function (4) (i.e. the 'Q' matrices) are carefully chosen to suppress aggressive movement. However, finding the right values of Q can be difficult (non-intuitive) whereas tuning by generating reference trajectories is straightforward.

Figure 5:
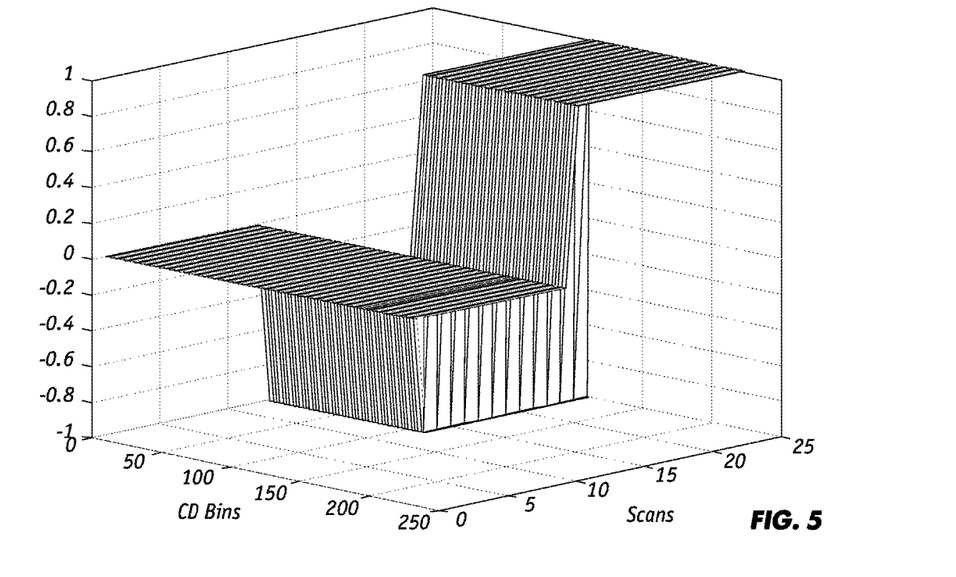
FIG. 5 illustrates a representative generation of the profile reference trajectory.
Figure 6A:
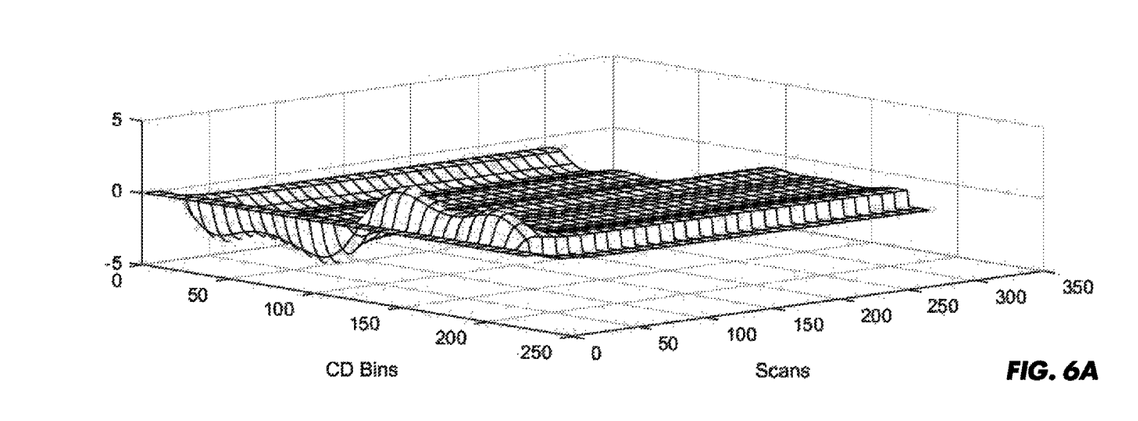
FIGS. 6A and 6B show a CD MPC response to the target profile change that is illustrated in FIG. 5.
Figure 6B:
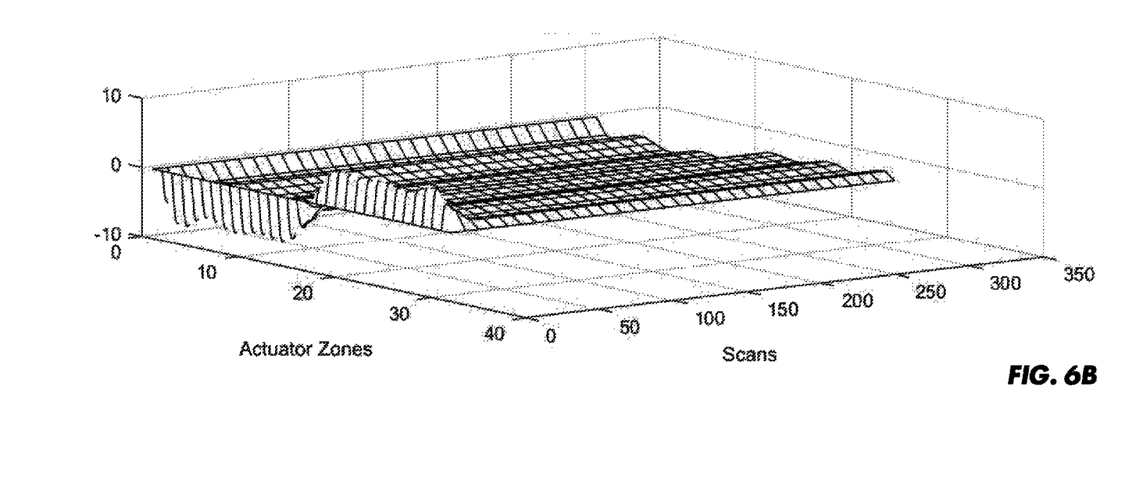
Figure 7A:
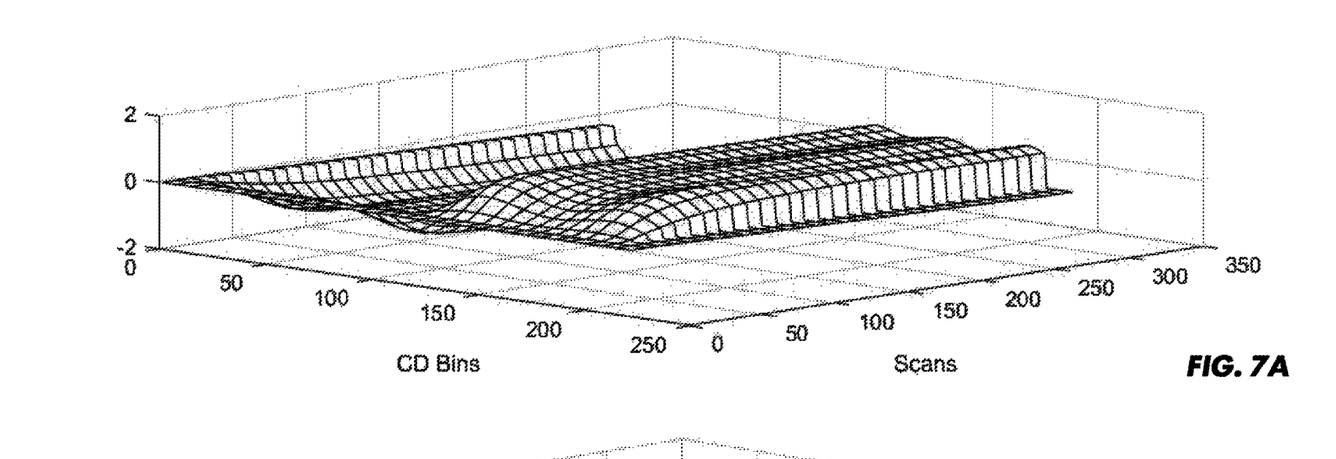
FIGS. 7A and 7B show another CD MPC response to the target profile that is illustrated in FIG. 5.
Figure 7B:
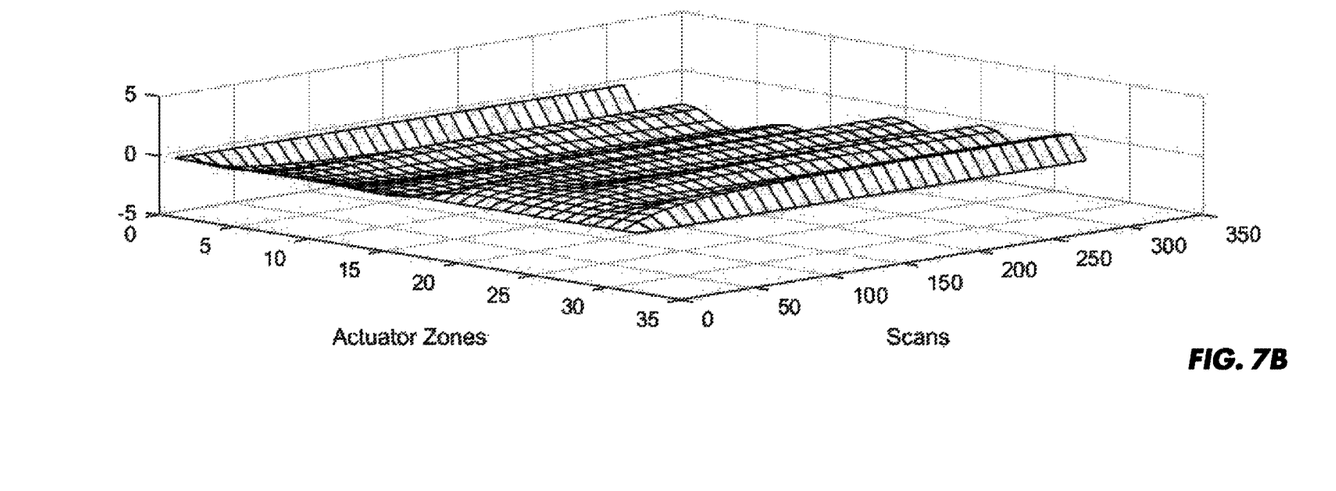

FIG. 5 illustrates a "typical" generation of the profile reference trajectory with its characteristic sharp change to the new target profile once the time delay elapses. FIGS. 6A and 6B illustrate a CD-MPC response to the target profile change illustrated in FIG. 5. Here a low value for the $Q_2$ matrix is used which allowed for aggressive actuator movement to track the profile reference trajectory. FIGS. 6A and 6B show the (over) aggressive behavior of the controller without the reference trajectories (or with the simple, step reference trajectory shown in FIG. 5) and with low (Q) movement penalty weights. There are large and fast movements of both measurement and actuator profiles over time (scans). The present invention avoids these behaviors. FIGS. 7A and 7B show the same controller (basic trajectory) with heavier weights. As is apparent, the movements of the actuator and measurement profiles are now too slow. In particular, FIGS. 7A and 7B illustrate the CD-MPC response to the target profile change illustrated in FIG. 5. Here a higher value for the value for the $Q_2$ matrix thereby moderating actuator movement but resulting in slower tracking of the reference trajectory.

The difference between the 2 responses (shown in FIGS. 5 and 6) comes from changing the $Q_2$ weighting by 4 orders of magnitude. In addition to making the tuning somewhat challenging for some industrial users, large actuator movement penalties can sometimes lead to undesired sluggish controller behavior.

Figure 8:
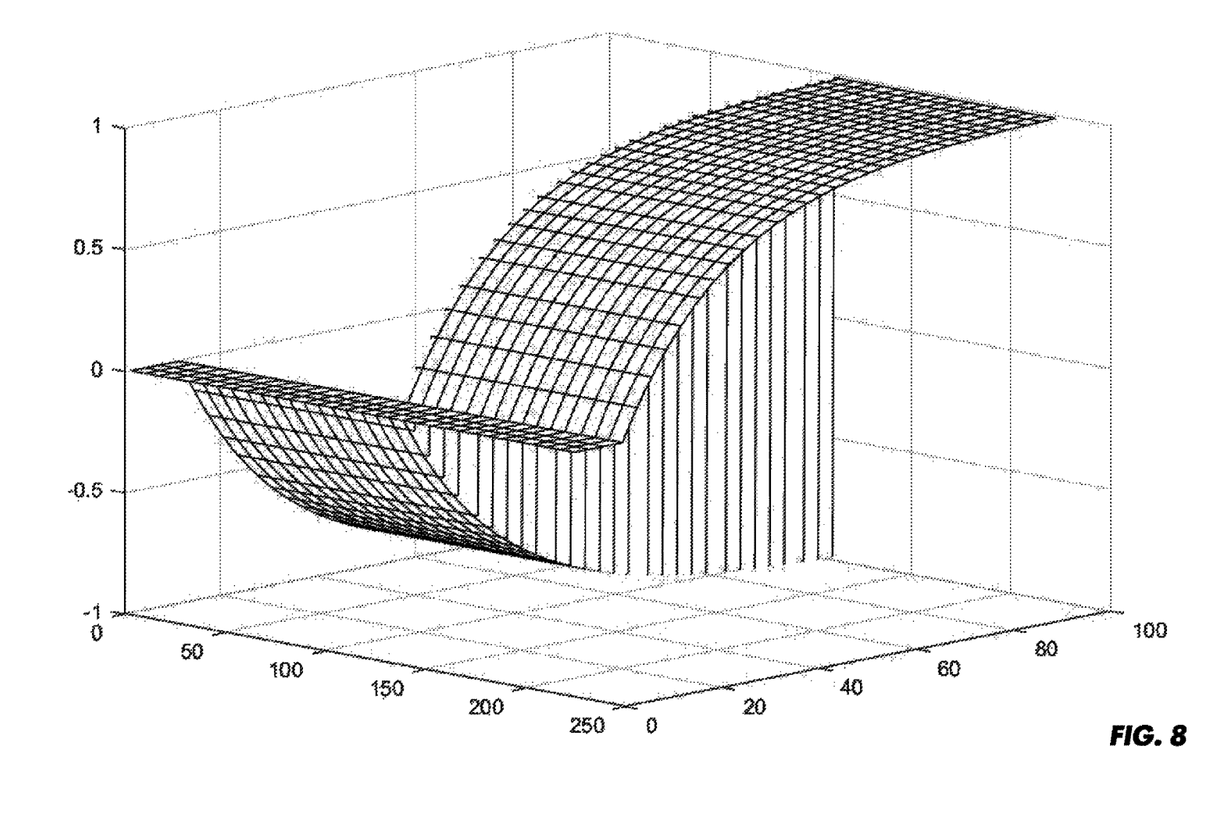
FIG. 8 illustrates an initial profile target trajectory.

If instead, a reference trajectory that can be achieved without large and aggressive control moves was chosen, it may not be necessary to use large actuator movement cost weights. For example, if the target profile is filtered using the transfer function $$\frac{1-a_r}{1-a_r z^{-1}},$$

so that:

$$y_{sp}(k+i)=a_r y_{sp}(k+i-1)+(1-a_r)(tgt(k+i-t_d)-d_y(k+i-t_d)), \quad i \le t_d$$

$$y_{sp}(k+i)=a_r y_{sp}(k+i-1)+(1-a_r)(y_{tgt}(k)-d_y(k)), i>t_d$$

less aggressive control is achieved. In particular, if a in the model (1) is $a=e^{-\Delta T/\tau}$, then it is convenient to choose $a_r=e^{-\Delta t/\alpha \tau}$ where $\alpha$ is some multiplier with a value around 2. The results of modifying the profile reference trajectories in this way are illustrated by FIGS. 8 and 9.

Figure 9A:
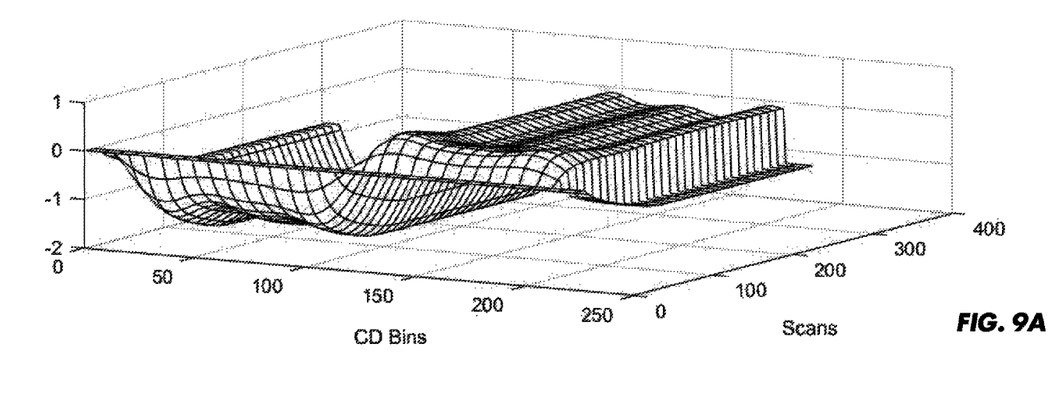
FIGS. 9A and 9B show a CD MPC response to the target profile change that is illustrated in FIG. 8.
Figure 9B:
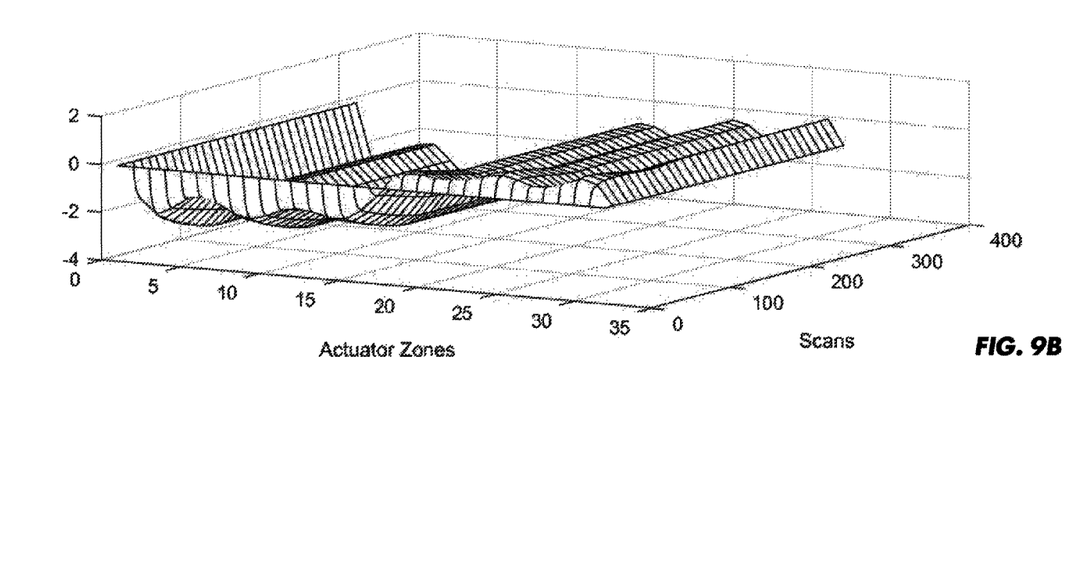

FIG. 8 illustrates a temporally filtered profile reference trajectory exhibiting a gradual change towards the new target profile once the time delay elapses. FIGS. 9A and 9B show the CD-MPC response to the target change illustrated in FIG. 8. Here a low value for the $Q_2$ matrix is used but the actuator movement is moderate since that is all that is required to track the filtered reference trajectory. By applying appropriately designed reference trajectories to the controller, the movements of the measurement and actuator arrays are neither too slow nor too fast. This is (qualitatively) the type of behavior that is desired in paper machine control and in other flat sheet process control. The $\alpha_r$ parameters in the reference trajectory generation also allow adjustment of the speeds of change of actuator (and measurement) profiles in a straightforward, predictable and intuitive manner.

To control the spatial variation of the actuators, the $S_b$ and $q_4$ cost function matrices can be used to explicitly penalize high frequency actuator spatial variation. Another approach is to spatially filter the reference profile error. That is, a spatial filter is employed to remove uncontrollable spatial frequencies from the error profile $y(k+i)-y_{sp}(k+i)$. That is, the cost function is modified to be:

$$J = \sum_{i=1}^{H_p} (y(k+1)-y_{sp}(k+1))^T F^T Q_1 F(y(k+1)-y_{sp}(k+1)) + \sum_{i=0}^{H_u-1} [(\Delta u(k+1))^T Q_2(\Delta u(k+1)) + (u(k+1)-u_{sp}(k+1))^T Q_3(u(k+1)-u_{sp}(k+1)) + (u(k+1))^T Q_4 u(k+1)]$$

The use of the spatial filter could be more meaningful to some users, and by removing spatially uncontrollable frequencies from the measurement error profile, it would prevent the controller from moving the actuator with high spatial frequencies. Since temporal filtering of the profile reference trajectory reduces the need to penalize actuator movement in the temporal direction, it is expected that something analogous could be achieved spatially, that is, spatially filtering the error profiles reduces the need penalize actuator movement in the spatial direction. However, when the spatially filtered measurement error profiles can still not be easily controlled, such as when some actuator elements cannot be moved, it may still be necessary to penalize high frequency actuator spatial variation. Therefore, although the modified controller can include a spatial filter, it appears that it is a more robust approach to continue to use the filter $S_b$ and the weighting matrix $q_4$.

What is claimed is:

1. A system which forms a material in a spatially-distributed multivariable-array cross-directional process wherein the system comprises: at least one set of actuator arrays each distributed adjacent to the material in the cross direction (CD), wherein each set of actuator arrays is controllable to vary the properties of the material; means for measuring and acquiring data about the properties of the material and generating a cross-directional measurement, and a multivariable model predictive controller (MPC) for providing CD control to the cross-directional process, wherein the MPC employs a cost function incorporating a prediction horizon, wherein the MPC in response to signals that are indicative of the properties of the material, provides signals to the at least one set of actuator arrays to vary properties of the material, and wherein the MPC is configured to provide a measurement profile target reference trajectory over the prediction horizon of the MPC cost function wherein the MPC is configured to employ a series of target profiles over an entire prediction horizon thereby creating a reference trajectory to bring the cross-directional measurement smoothly from their current profile to a final target, wherein the MPC is configured to employ a model that generates an output estimate of the spatially-distributed multivariable-array cross-directional process and wherein the model is used to create a filter operation to determine how aggressively the MPC responds to changes in output target signals, wherein at each controller update, the current measurement target profile is filtered through a first order plus deadline process and repeating the filter operation once for each step in the prediction horizon generates a full reference trajectory for the measurement profile, and wherein the MPC is configured to spatially filter a reference profile error to remove uncontrollable spatial frequencies from an error profile.

2. The system of claim 1 wherein the filter is initialized to a current measurement profile so that the reference trajectory provides a smooth path from the current profile towards the final target profile.

3. The system of claim 1 wherein the filter operation tunes operations of the MPC.

4. The system of claim 1 wherein the MPC is configured to apply a weighting matrix on actuator bending and picketing to penalize high frequency actuator spatial variation.

5. The system of claim 1 wherein the MPC is configured to apply a bending moment matrix to penalize high frequency actuator spatial variation.

6. A method of controlling a spatially-distributed multiple-array, sheetmaking cross-directional (CD) process that forms a material and having at least one manipulated actuator array and at least one controlled measurement array that generates a cross-directional measurement, said method comprises employing a multivariable model predictive controller (MPC) which employs a cost function incorporating a prediction horizon, wherein the MPC in response to signals that are indicative of the properties of the material, provides signals to at least one set of actuator arrays to vary properties of the material, and wherein the MPC is configured to provide a measurement profile target reference trajectory over the prediction horizon of the MPC cost function wherein the MPC is configured to employ a series of target profiles over an entire prediction horizon thereby creating a reference trajectory to bring the cross-directional measurement smoothly from their current profile to a final target, wherein the MPC is configured to employ a model that generates an output estimate of the spatially-distributed multivariable-array cross-directional process and wherein the model is used to create a filter operation to determine how aggressively the MPC responds to changes in output target signals, wherein at each controller update, the current measurement target profile is filtered through a first order plus deadline process and repeating the filter operation once for each step in the prediction horizon generates a full reference trajectory for the measurement profile, and wherein the MPC is configured to spatially filter a reference profile error to remove uncontrollable spatial frequencies from an error profile.

7. The method of claim 6 wherein the filter is initialized to a current measurement profile so that the reference trajectory provides a smooth path from the current profile towards the final target profile.

8. The method of claim 6 wherein the filter operation tunes operations of the MPC.

9. The method of claim 6 wherein the MPC is configured to apply a weighting matrix on actuator bending and picketing to penalize high frequency actuator spatial variation.

10. The method of claim 6 wherein the MPC is configured to apply a bending moment matrix to penalize high frequency actuator spatial variation.

11. A non-transitory computer readable medium embodying a computer program for tuning a model predictive controller (MPC) employed to control a cross-directional process that forms a material and having a manipulated actuator array comprising a plurality of actuators and at least one controlled measurement array that generates a cross-directional measurement and wherein the MPC employs a cost function incorporating a prediction horizon, wherein the MPC in response to signals that are indicative of the properties of the material, provides signals to the at least one set of actuator arrays to vary properties of the material, and wherein the MPC is configured to provide a measurement profile target reference trajectory over the prediction horizon of the MPC cost function, wherein the MPC employs a model that generates model output estimates and wherein the program comprises readable program code for: filtering the output target profile to determine how aggressively the MPC responds to changes in output target signals wherein the MPC is configured to employ a series of target profiles over an entire prediction horizon thereby creating a reference trajectory to bring the cross-directional measurement smoothly from their current profile to a final target, wherein the MPC is configured to employ a model that generates an output estimate of the spatially-distributed multivariable-array cross-directional process and wherein the model is used to create a filter operation to determine how aggressively the MPC responds to changes in output target signals, wherein at each controller update, the current measurement target profile is filtered through a first order plus deadline process and repeating the filter operation once for each step in the prediction horizon generates a full reference trajectory for the measurement profile, and wherein the MPC is configured to spatially filter a reference profile error to remove uncontrollable spatial frequencies from an error profile.

12. The non-transitory computer readable medium of claim 11 wherein the filter is initialized to a current measurement profile so that the reference trajectory provides a smooth path from the current profile towards the final target profile.

13. The non-transitory computer readable medium of claim 11 wherein the filter operation tunes operations of the MPC.

14. The non-transitory computer readable medium of claim 11 wherein the MPC is configured to apply a weighting matrix on actuator bending and picketing to penalize high frequency actuator spatial variation.

15. The non-transitory computer readable medium of claim 11 wherein the MPC is configured to apply a bending moment matrix to penalize high frequency actuator spatial variation.

* * * * *